United States Patent [19]
Colas et al.

[11] 3,856,202
[45] Dec. 24, 1974

[54] TRACK ELEMENT FOR LINEAR MOTOR VEHICLES AND A TRACK USING SUCH AN ELEMENT

[76] Inventors: Francois Colas, 10 Avenue de Petit Chambord, Bourg-la-Reine; Claude Gregorian, 4 Allee Racine, Sevran, both of France

[22] Filed: Dec. 1, 1972

[21] Appl. No.: 311,109

[30] Foreign Application Priority Data
Dec. 1, 1971 France .............................. 71.43129

[52] U.S. Cl........... 238/122, 104/148 LM, 238/134, 238/151, 238/243
[51] Int. Cl. ....................... E01b 11/00, E01b 25/00
[58] Field of Search .......... 238/121, 122, 127, 134, 238/143-148, 149, 150, 152, 218, 219, 225, 238/226, 229, 161.5; 104/148 LM

[56] References Cited
UNITED STATES PATENTS

| | | | |
|---|---|---|---|
| 1,371,585 | 3/1921 | Webb.................................. | 238/229 |
| 2,290,584 | 7/1941 | Gardner et al...................... | 238/122 |
| 2,985,376 | 5/1961 | Smith.................................. | 238/122 |
| 3,169,489 | 2/1965 | Ruston............................... | 238/122 |
| 3,602,655 | 8/1971 | Scofield.............................. | 238/143 |

Primary Examiner—M. Henson Wood, Jr.
Assistant Examiner—Richard A. Bertsch
Attorney, Agent, or Firm—McDougall, Hersh & Scott

[57] ABSTRACT

A track element for a linear motor vehicle, providing both for guiding and traction of the vehicle, and a track using such an element. The track comprises rails having a cavitied limb and a sole piece. The walls of the limb are at an angle of from 2° to 5° to each other. Provided at the top of the limb is a tubular bead-shaped portion. A means for fish-plating the rails comprises at least one sealing joint and a fish plate straddling two rails and slid into two corresponding cavities.

8 Claims, 13 Drawing Figures

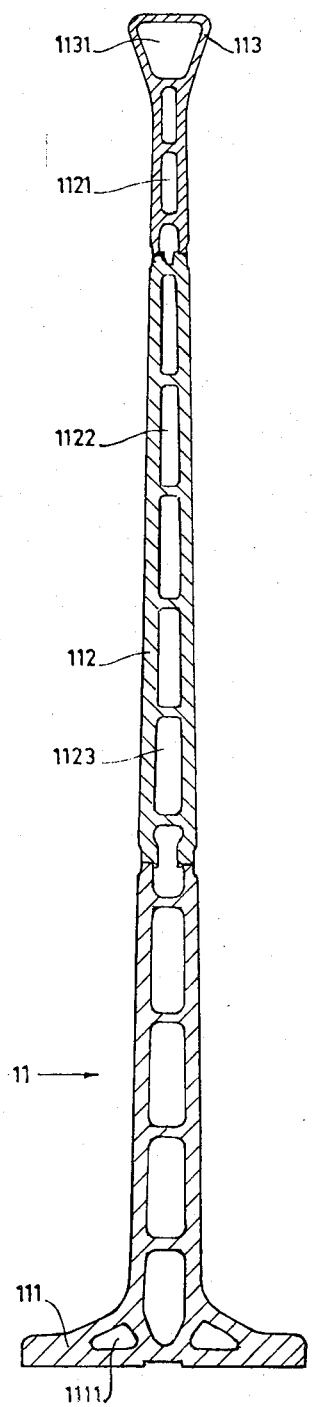

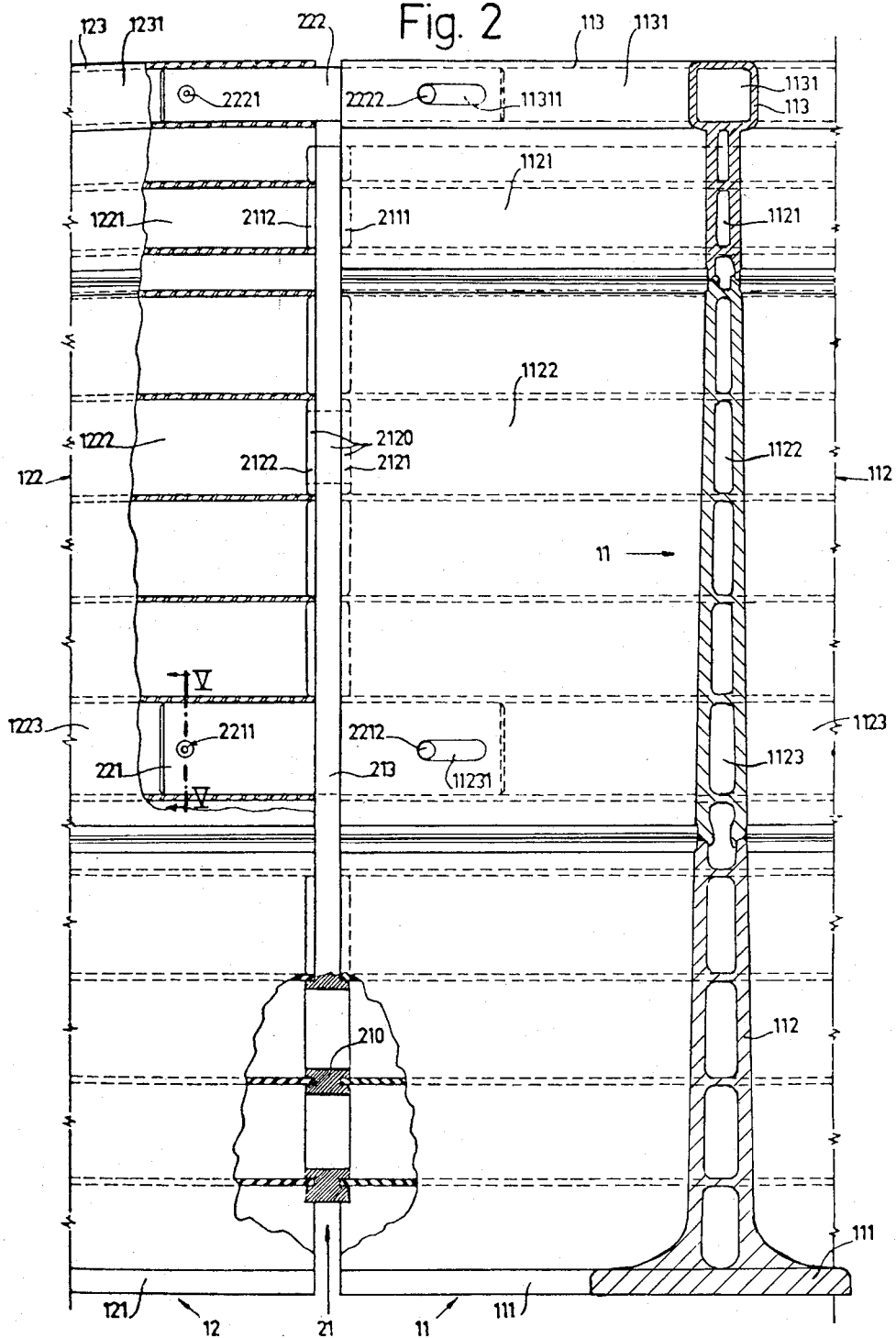

Fig. 4
Fig. 3
Fig. 5
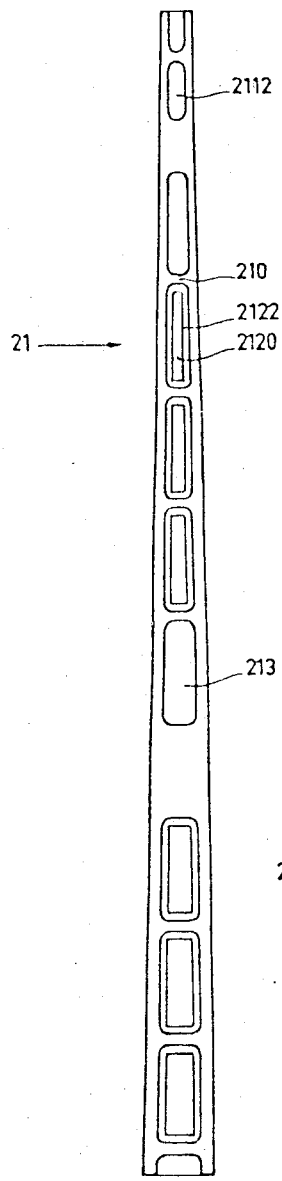
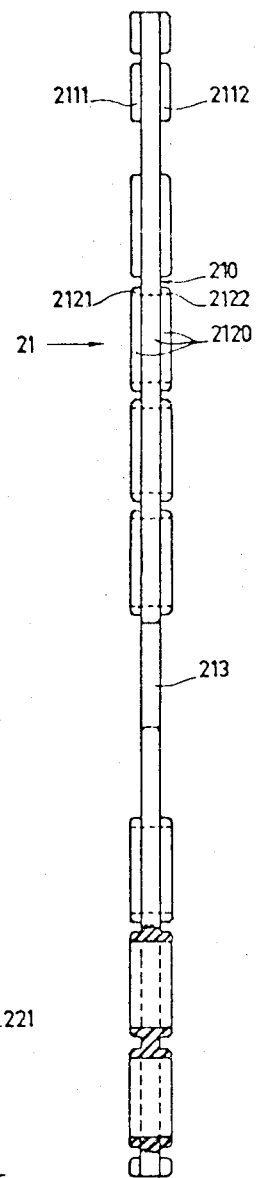
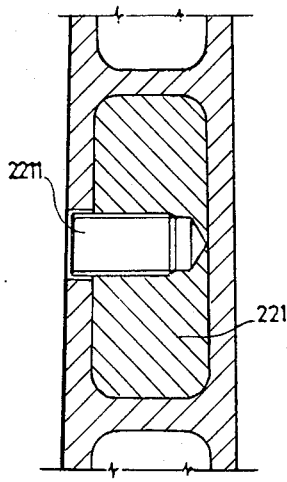

TRACK ELEMENT FOR LINEAR MOTOR VEHICLES AND A TRACK USING SUCH AN ELEMENT

The present invention relates to a track element for a linear motor vehicle, and a track using such an element. The invention is particularly applicable to linear motor vehicles which travel over land on tracks and which are supported on air cushions.

It is known that moving vehicles can be supported by gaseous over-pressure which is created in air cushions, in virtually closed volumes of which one wall is formed by the surface of a platform, the other walls being fixed with respect to the vehicle. Such vehicles are likewise guided by means of at least two air cushions which are located on respective sides of a vertical guide track and which are delimited by the side surfaces of the track. The guide track often has a cross-section of an inverted T-shape.

It is of advantage for such a vehicle to be actuated by means of a linear motor, the armature of which comprises a traction track. In accordance with the prior art, the track has been made of aluminum alloy, having an inverted T-shape cross-section, the vertical limb of the T being provided with cavities for giving maximum lightness. In accordance with French Pat. No. 1,573,228 in the name of SA. BERTIN et Cie, the track is of inverted T-shape cross-section, with a solid vertical limb, and acts both as a guide track and a traction track.

A track which acts both as a guide track and a traction track for a linear motor vehicle, and more particularly, a ground-effect vehicle, must comply with a very wide range of criteria. It must enjoy a mechanical strength which permits it to carry the lateral forces which are applied by the vehicle under the effect of a side wind or centrifugal force.

It must also be possible for the track to be cooled in the zones in which very strong electric currents may pass through it; zones in which the vehicles start, accelerate or climb a slope. At these particular points, the temperature of the track can exceed 150°C., and it can rise above the melting point of the rail if the vehicle is prevented from moving. Existing tracks do not effectively solve this problem.

It is an object of this invention to provide a track element for a linear motor vehicle, which serves both as a guide track and a traction track for the vehicle and which nonetheless has mechanical strength and the necessary provisions for cooling.

It is a further object to provide a track using such an element.

The track element according to the invention comprises rails having a vertical cavitied limb and a horizontal sole piece, which rails are joined by fish-plate means. The two lateral walls of the vertical limb of the rail are at an angle to each other of from 2° to 5°, at least in the part which forms the armature of the traction motor of the vehicle. Provided upon the top of the vertical limb is a tubular bead-shaped portion, of transverse rigidity, having an internal cavity.

The track according to the invention comprises the assembly of such track elements by fish-plate means, each of which comprises a sealing joint of resilient material, at least one fish-plate which is slid, astride two consecutive rails, into two corresponding cavities, and another fish-plate which is slid into the two internal cavities in the rigidity-giving bead-shaped portions of the same rails.

In accordance with a preferred embodiment of the invention, the sealing joint comprises a central element which matches the shape of the vertical limb of the rails and, in line with most of the cavities, protuberances on respective sides of the central element, the protuberances being capable of engaging respectively into the corresponding cavities of the rails to be joined. At least one other cavity, an aperture having the cross-section of the corresponding cavities, is provided to permit the passage of a fish-plate.

The invention as defined hereinbefore will not be described by way of examples shown in the accompanying drawings.

FIG. 1 shows a vertical section of a rail;

FIGS. 2 to 5 show a junction between two rails, FIG. 2 being a partly cut-away side elevation, FIGS. 3 and 4 being side elevations seen in two directions perpendicular to the sealing joint, and FIG. 5 being a cross-section taken along line V in FIG. 2;

FIGS. 8 and 9 show one embodiment of means for securing a rail to a table, FIG. 8 being a cross-section while FIG. 9 shows a plan view of a sleeper clip and a shaped guard skirt member;

Figure 6:
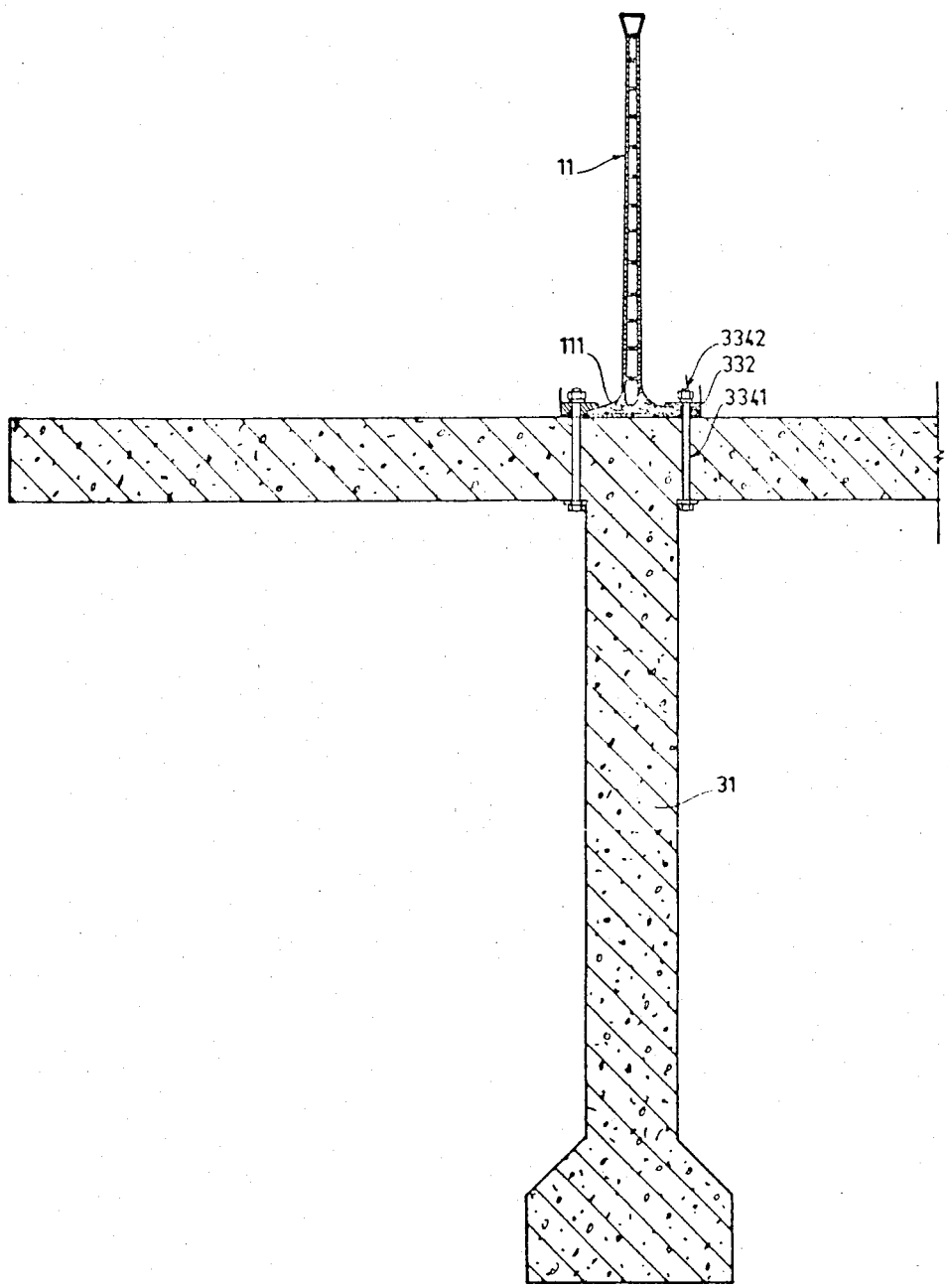
FIGS. 6 and 7 show a cross-section of the track mounted on a substructure, in a running zone and in an end zone, respectively.

In the drawings, the same components are denoted by the same references.

The track comprises rails such as 11 and 12 which are joined end to end and whose cross-section is in the shape of an inverted T. A rail 11 comprises (FIG. 1) a sole piece 111, a vertical limb 112 and a tubular bead-shaped portion of transverse rigidity 113. The rail has cavities, the bead-shaped portion 113 having an internal cavity 1131, the vertical limb having multiple cavities such as 1121, 1122, 1123, while the sole piece can comprise cavities 111 as shown in FIG. 2. The vertical limb and the sole piece form a solid of equal strength, having a variable moment of inertia, while the wall of the cavities is of small thickness.

It should be noted that the outside walls of the track elements, at least on the parts which form the armature of the linear motor of the vehicle which will move on the track, are inclined with respect to the plane of symmetry of the rail. The angle which the two walls form relative to each other is from 2° to 5°.

Some of the cavities such as the cavity 1122 advantageously form a passage for the circulation of a cooling fluid, as will be described hereinafter. The rail is made by extruding an aluminum alloy, either in one piece or in a number of pieces which are then joined together by welding, as shown in FIGS. 1 and 2.

The rail 12 is identical to the rail 11, and can be described by replacing the first two digits 11 of all the references in the foregoing description of the rail 11, by the two digits 12.

By means of the cavities, two consecutive rails 11 and 12 can be joined by positive fish-plating. As shown in FIG. 2, a resilient sealing joint is placed between the two rails. The joint 21, as shown in FIGS. 3 and 4, has a central element 210 which matches the shape of the vertical limb 112 of the rails and, in line with most of the cavities, has protuberances 2111 and 2112 which are located on respective sides of the central element 210 and which are capable of respectively engaging into the corresponding cavities 1121 and 1221. In line with the cavities 1122 and 1222, which can be used to carry a cooling fluid, a passage 2120 is provided in the joint and in its protuberances 2121 and 2122.

In line with some of the cavities, the joint does not have any protuberances, but only an aperture 213 whose cross-section is that of the corresponding cavities 1123 and 1223. A fish-plate 221 whose outside dimensions are very slightly smaller than the internal dimensions of the cavities 1123 and 1223 is slid into the latter, straddling the two rails, and fixed in one of the cavities by screw means 2211 or any other means. The plate can slide in the other cavity so as to permit some expansion of the rails (FIGS. 2 and 5). The mechanical strength of the assembly can be improved by a guide means comprising a stud 2212 which is secured to the fish-plate and which is slideable in an elongate slot 11231 formed in the wall of the cavities 1123.

Another fish-plate 222 similarly joins the internal cavities 1131 and 1231 of the bead-shaped portions 113 and 123. The fish-plate 222 is secured by screwing a screw means 2221 and carries a stud 2222 which is slideable in a slot 11311 provided in the wall of the cavity 1131. Additional fish-plates can be provided, in the same way, in order to join other cavities.

Figure 7:
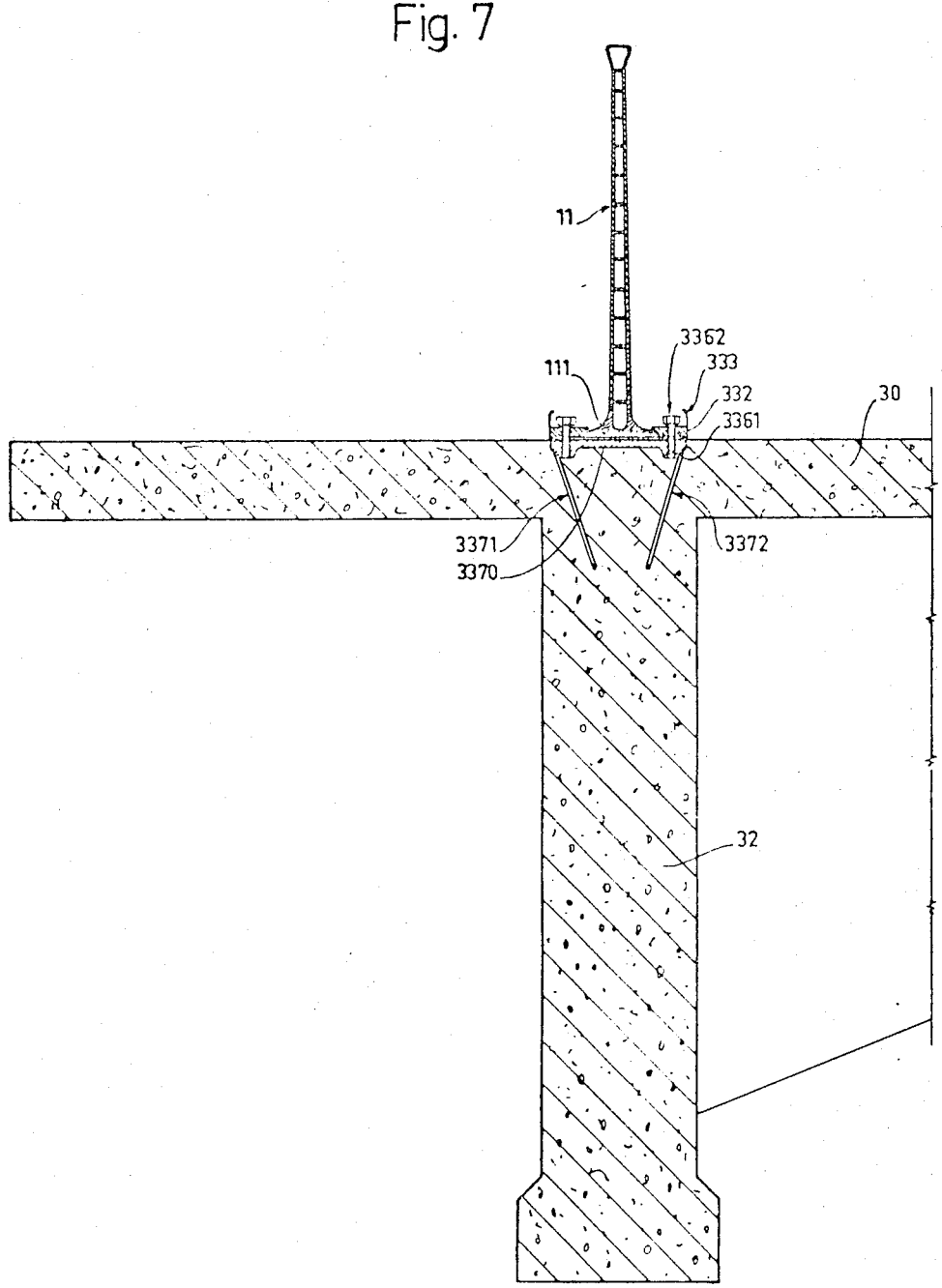

The rails which form the track are mounted on a platform which is formed by a table 30 provided with vertical strengthening ribs 31 of prestressed concrete, the rails being secured vertically above the ribs. The ribs 31 are narrow in the running parts of the track, as shown in FIG. 6, their width being of the order of the width of the foot of the rail. In some zones, such as the zones at the end of each table element, as shown in FIG. 7, the ribs 32 are enlarged.

The foot of the rail rests on an adjustment packing piece 331 (FIG. 8) whose thickness varies so as to permit slight erros in height to be corrected; it is mounted on the table 30 by means of rigid sleeper clips 332 which are apertured at 3320 and which comprise a heel portion 3321 capable of resting on the table or possibly on the packing piece 331. A toe portion 3322 having the shape of the end of the upper surface of the sole piece 111 of the rails rests thereon and the upper face 3323 of the sleeper clip can be clamped by nuts 3342. Biting of the heel portion of the sleeper clips on to the surface of the table 30, and defective presentation of the restraining means, when the vehicle is a ground effect vehicle, on to the foot portion of the rail, are prevented by means of a shaped skirt guard member 333 which is held in place under the heel portion 3321 of the sleeper clip. There are preferably two apertures 3320.

Figure 8:
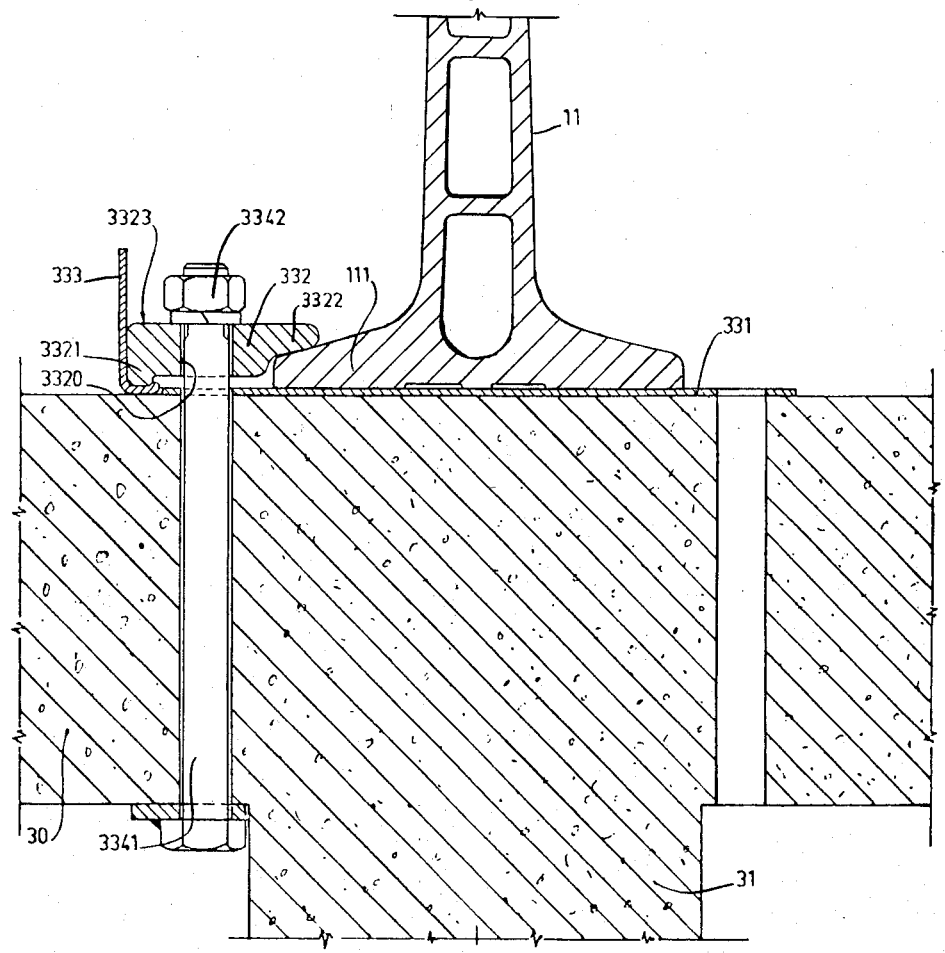
Figure 9:
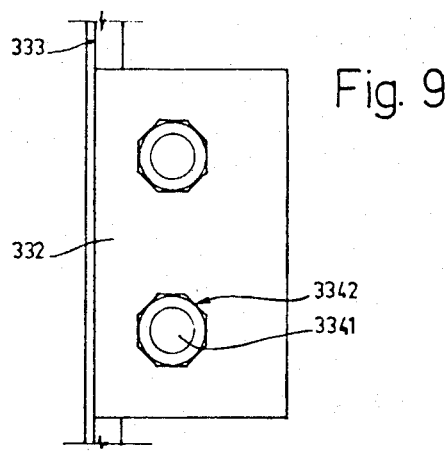

Fixing can be effected in various ways, for example by means of bolts 3341 passed through holes through the table, and through the apertures 3320 in the sleeper clip, with clamping nuts 3342 which engage the upper face 3323 of the sleeper clip (FIGS. 8 and 9).

Figure 10:
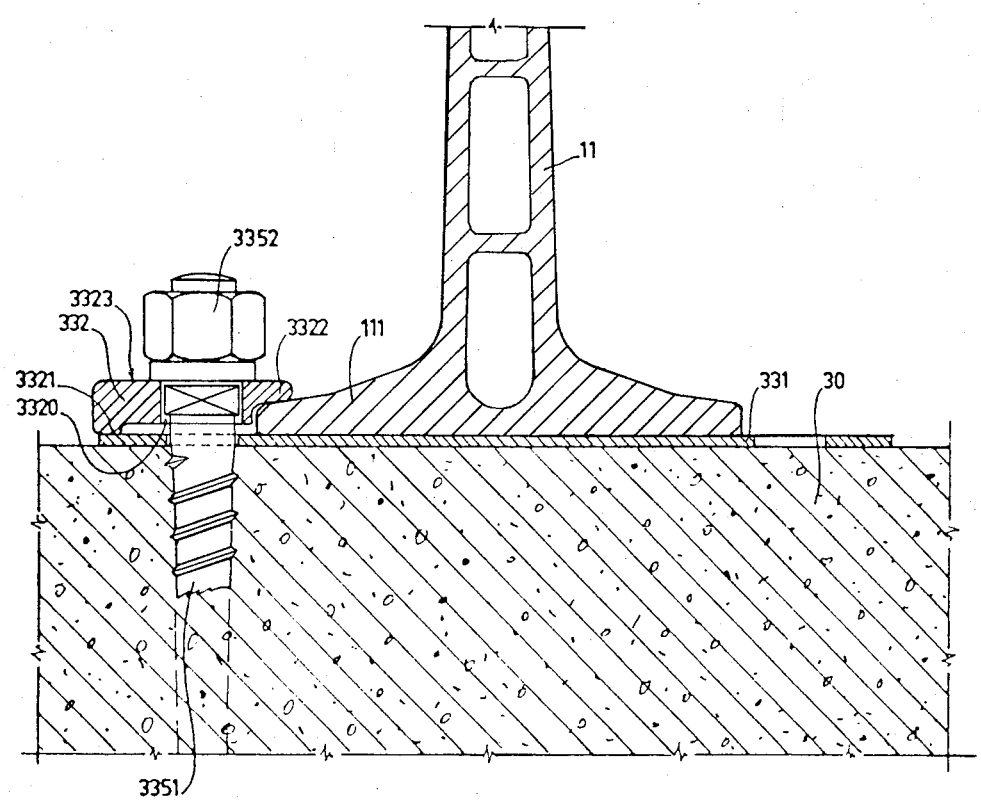
FIGS. 10 to 13 are cross-sections showing other embodiments of means for fixing a rail to a table, FIG. 10 using foundation bolts, FIG. 11 showing a packing plate secured by stirrup members shown in FIG. 12, while the device in FIG. 13 provides for resilient fixing.

Alternatively, foundatiton bolts 3351 are embedded in the mass of concrete of the table, and pass through the apertures 3320 with clamping nuts 3352 engaging the upper face 3323 of the sleeper clip (FIG. 10).

It will be noted that, in the above two cases, the guard skirt 333 can be omitted, provided that the packing piece 331 is sufficiently wide for the heel portion 3321 to rest on the packing piece.

Figure 11:
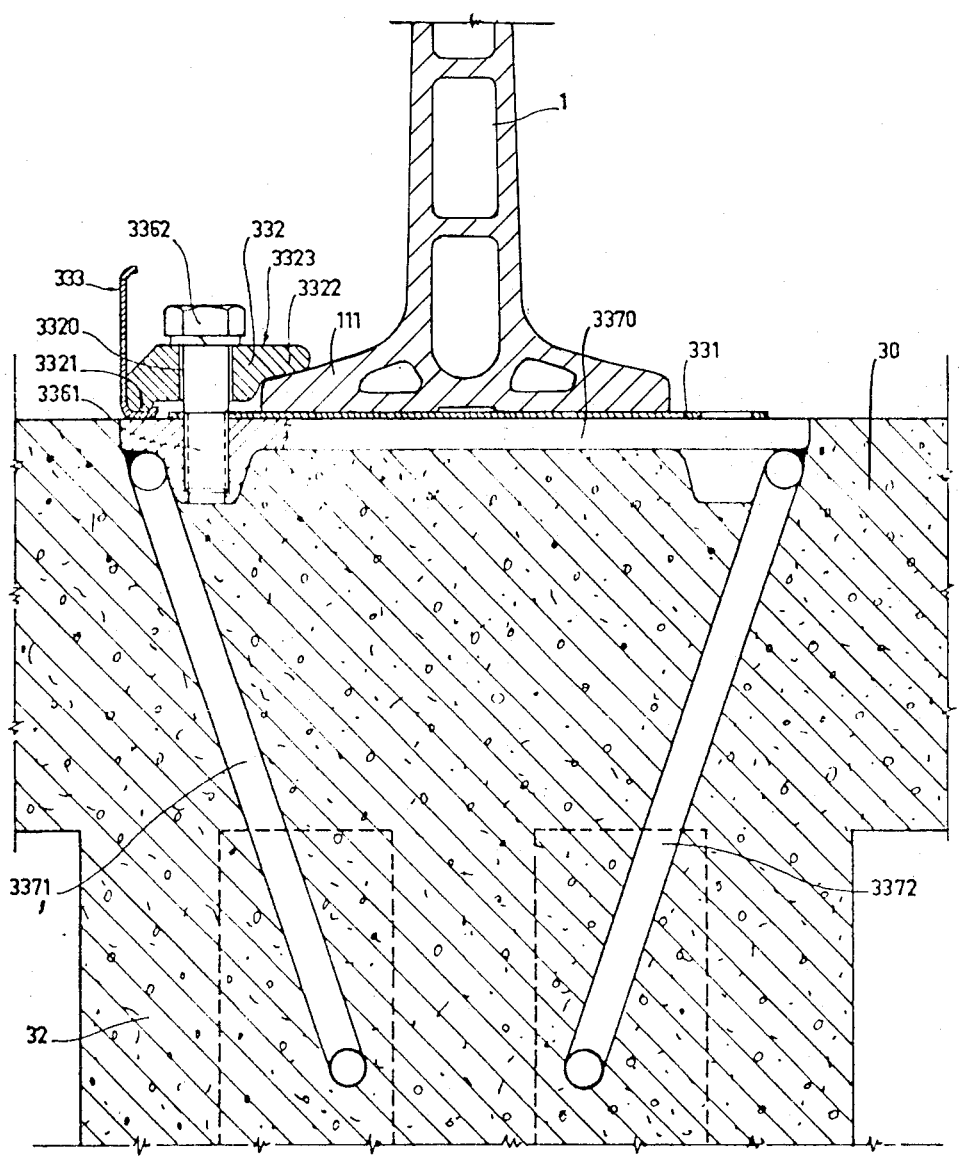
Figure 12:
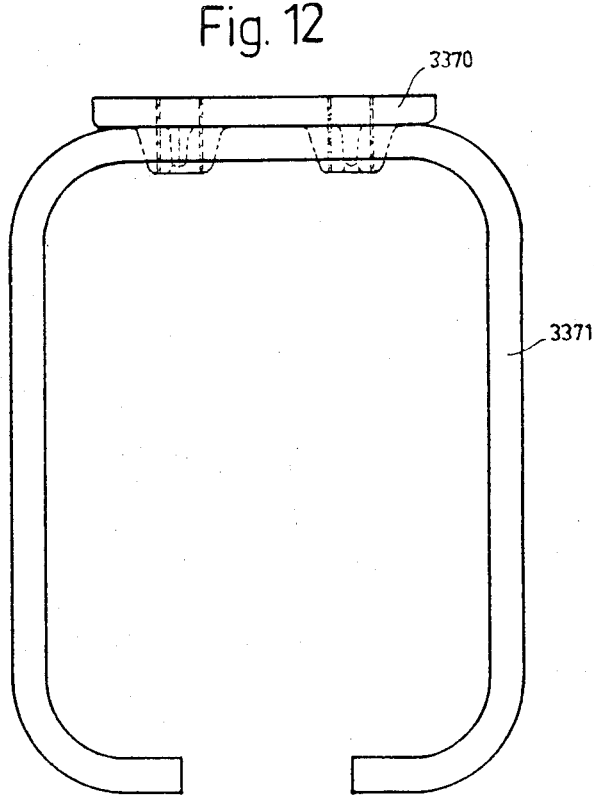

As a further alternative, screw means 3361 with hexagonal heads 3362, are screwed into a screw-threaded hole in a packing plate 3370 on which the foot portion 111 of the rail rests, with interposition of the adjustment packing piece 331. The screw means 3361 also pass through the apertures 3320 in the sleeper clip 332, with their hexagonal heads 3362 engaging the upper face 3323 of the sleeper clip (FIGS. 11 and 12). The packing plate 3370 is located in a recess provided in the table 30 and held in place by means of C-shaped stirrup means 3371 and 3372 which are welded to it and which are embedded in the mass of concrete of the table. This last-described means is particularly used at the end region of the tables 30.

The above described fixing means can be made resilient by replacing the rigid sleeper clip by a resilient sleeper clip.

Figure 13:
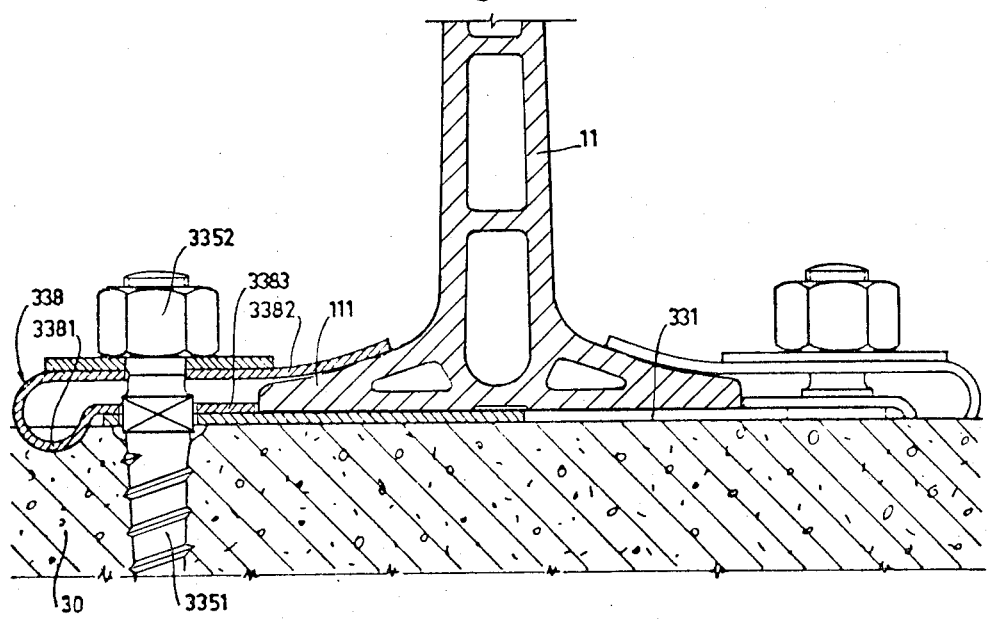

FIG. 13 shows an alternative form of the means shown in FIG. 10, in which the rigid sleeper clip 332 is replaced by a resilient sleeper clip 338 which comprises a spring-steel tongue portion bent over on to itself. The sleeper clip comprises an upper blade portion 3382 and a lower blade portion 3383 which form a foot member, the two blade portions being joined by a portion which is substantially formed by three-quarters of a circle (3381), thereby forming a heel portion. The sleeper clip is secured by a foundation bolt 3351 and a nut 3352, identical to the corresponding components shown in FIG. 10.

Producing the above-described rail from aluminum alloy by extrusion, either in one piece or in a plurality of pieces which are joined together by welding, makes it possible to achieve a high degree of precision in the dimensions of the rail, and a very good surface condition, without any finishing. The position of the cavities, the vertical limb and the sole piece with its variable moment of inertia, give the track element a balanced structure forming a solid of equal strength and minimum mass.

The provision of cavities of regular shape also permits positive fish-plating and aligning of adjoining rails, the connection being sealed with respect to the low-pressure air in spite of the differential expansion which occurs between aluminum alloy and the concrete, by virtue of the provision of the joints 21, and because the joints perfectly maintain their sealing action. Such sealing action makes it possible, if required, for the rail to be cooled by circulating a cooling fluid such as air in the regions of the track through which a very strong electric current will pass, such as the regions of the track in which a vehicle climbs a severe slope, or starts off, in which the temperatures of the rail without such a cooling effect would run the risk of rising to 150° C.

Moreover, the inclination of the two side walls of the vertical limb relative to each other, while contributing to giving the rail the maximum mechanical strength for the minimum possible weight, permits very precise adjustmment of the air gap by acting on the position of the armatures of the linear motor of the vehicle which runs on the track. This results in a reduction in the width of the air gap, and also makes the width of the air gap independent of the kinking tolerance of the rail, defects in packing the rail when the rail is laid in place, errors in perpendicularity of the rail, and also independence as regards the maximum modulus of sagging of the rail under the effect of bending stresses.

Kinking of the rail can result either from side forces or from expansion due to the heat given off in the region of the vertical limb of the track element, which forms the armature of the linear motor. The inductor of the linear motor has a free space of rectangular cross-section, into which the armature engages; the air gap between each wall of the armature and the adjacent part of the inductor should be minimal, but without ever being zero. The air gap, which is small in the lower part of the armature, increases with the height of the section in question, by virtue of the inclination of the walls of the armature relative to its plane of symmetry. Kinking of the rail causes one of the walls of the armature to be moved towards an upright position, and such movement can be of such an extent as to make the side wall of the rail vertical. The minimum value of the angle of the walls relative to each other, namely 2°, results from inclination of the vertical limb of the rail, corresponding to the maximum kinking of the rail. The maximum value, namely 5°, corresponds to the necessity to preserve, for a given thickness of vertical limb at the base of the rail, a thickness which is sufficient to connect to the bead-shaped portion at the top of the vertical limb of the rail. The walls are inclined at least in the region of the vertical limb which forms the armature for the linear motor, but the walls are advantageously inclined over their whole height.

The rail can be produced in units of great length, has an excellent resistance to corrosion in industrial or marine atmosphere, and does not require any maintenance. It has good mechanical characteristics which enable it to withstand the bending stresses due to winds, centrifugal force, and yaw movements of the moving vehicle, such characteristics being maintained at the temperatures due to Jaule-effect heat stresses when the vehicles on the rail start.

The means for securing the rail to the table provide that the assembly requires a limited amount of space, of precise dimensions, after the rail has been laid. It permits the distance between fixing means to be varied so as to be compatible with the strength of the rail, while permitting displacement due to differential expansion as between the material of the rail and the concrete of the platform, while preventing untimely movement of the rail after a plurality of expansion cycles or when the vehicle on the rail is braking. It also permits the rail to be laid directly on the table without remachining, and provides for easy laying of the rail when it is necessary to replace a rail. The fixing means comprise a simple device for compensating for imperfections when they are themselves set in position, within the admitted tolerance limits. Finally, they do not require any holes to be made in the base portion of the rail.

In one embodiment, the rail is produced by drawing in three parts, as shown in FIG. 1, from an aluminum alloy comprising, by weight:

0.6 to 0.9 percent of silicon
0.4 to 0.7 percent of magnesium
up to 0.5 percent of manganese
up to 0.35 percent of iron
up to 0.20 percent of zinc
up to 0.30 percent of chromium
up to 0.10 percent of titanium
up to 0.20 percent of copper.

After hardening and tempering, the total height is 700 mm, the width of the sole piece 150 mm and the width of the bead-shaped portion at the top of the vertical limb of the rail, is 40 mm. The thickness of the walls is 4.3 mm for the bead-shaped portion, 4.5 mm for the vertical limb of the two upper elements, and 6.25 mm for the vertical limb of the lower elements, which latter dimension progressively increases up to 7.5 mm at the upper part of the sole piece. The weight per meter of the track element is approximately 30 kg. This rail is intended for a vehicle weighing 11 tons moving at a speed of 215 kph, and subjected to transverse forces of 100 kilonewtons.

The invention is used for producing a guide and traction track for any linear motor vehicle.

The vehicle can be mounted on vertical wheels running on the surface of the table 30, and guided by horizontal rollers on respective sides of the rail, running on the side walls of the vertical limb thereof.

The vehicle is preferably of the ground-effect type, which is supported by air cushions which cooperate with the surface of the table 30, and guided by other air cushions positioned on respective sides of the vertical limb of the rail and cooperating with the walls thereof.

It will be understood that various changes and modifications may be made in the construction described which provide the characteristics of this invention without departing from the spirit thereof, particularly as defined in the following claims.

We claim:

1. An assembly of track elements adapted to provide guide and traction means for a linear motor vehicle of the type carrying an inductor for cooperation with armature means associated with the track, each said element comprising a vertically extending limb, cavities defined by said limb at the ends thereof, a tubular bead-shaped portion of transverse rigidity extending along the top of said limb, cavities defined by said tubular portion at the ends thereof, at least some of the cavities in said limb and in said tubular portion comprising passages extending along the length thereof, means for joining the elements end-to-end to form the track, said joining means comprising fish-plate means which comprise a sealing joint of resilient material extending between the adjacent ends of said elements, at least one fish-plate being received within two adjacent cavities in a lower section of said elements and at least one additional fish-plate being received within the adjacent cavities of tubular portions of said elements, the upper section of said limb forming said armature, and wherein the exterior walls of said upper section diverge outwardly from the top of said limb at an angle between 2° and 5° relative to each other.

2. A track element in accordance with claim 1 wherein said sealing joint comprises protuberances adapted to be received within at least one of the cavities defined by adjoining elements.

3. A track element in accordance with claim 2 including means for delivering cooling fluid through at least some of the passages formed by said cavities.

4. A track element adapted to provide guide and traction means for a linear motor vehicle of the type carrying an inductor for cooperation with armature means associated with the track, said element comprising a vertically extending limb, cavities defined by said limb at the ends thereof, fish-plate means received within the cavities of the limb with the plate means extending outwardly of said ends for receipt in cavities of adjacent limbs whereby the elements can be joined end-to-end to form the track, the upper section of said limb forming said armature, the exterior walls of said upper section diverging outwardly from the top of said limb at an angle between 2° and 5° relative to each other, and wherein said track element is formed from an aluminum alloy containing 0.6 to 0.9 percent of silicon; 0.4 to 0.7 percent of magnesium; up to 0.5 percent of manganese; up to 0.35 percent of iron; up to 0.20 percent of zinc; up to 0.30 percent of chromium; up to 0.10 percent of titanium; and up to 0.20 percent of copper.

5. A track element in accordance with claim 4 including a tubular bead-shaped portion of transverse rigidity extending along the top of said limb.

6. A track element in accordance with claim 5 including a cavity defined by said tubular portion, the cavities in said limb including said tubular portion comprising passages extending along the length of said limb.

7. A track element in accordance with claim 6 wherein said fish-plate means comprise a sealing joint of resilient material extending between the adjacent ends of said elements, at least one fish-plate being received within two adjacent cavities in a lower section of said elements and at least one additional fish-plate being received within the adjacent cavities of tubular portions of said elements.

8. An assembly of track elements adapted to provide guide and traction means for a linear motor vehicle of the type carrying an inductor for cooperation with armature means associated with the track, each said element comprising a vertically extending limb, cavities defined by said limb at the ends thereof, a tubular bead-shaped portion of transverse rigidity extending along the top of said limb, cavities defined by said tubular portion at the ends thereof, at least some of the cavities in said limb and in said tubular portion comprising passages extending along the length thereof, cooling fluid in said passages at least in the upper section of said limb and in said tubular portion, means received within the cavities of the limb and tubular passage for joining adjacent elements end-to-end to form the track, the upper section of said limb forming said armature, and wherein the exterior walls of said upper section diverge outwardly from the top of said limb at an angle between 2° and 5° relative to each other to thereby permit adjustment of the air gap between said upper section and said inductor.

* * * * *